April 16, 1935. P. S. BAUER 1,997,712
APPARATUS FOR MEASURING OPTICAL DENSITIES
Filed Nov. 11, 1929 2 Sheets-Sheet 1

Inventor
Paul S. Bauer
by David Rines
Attorney

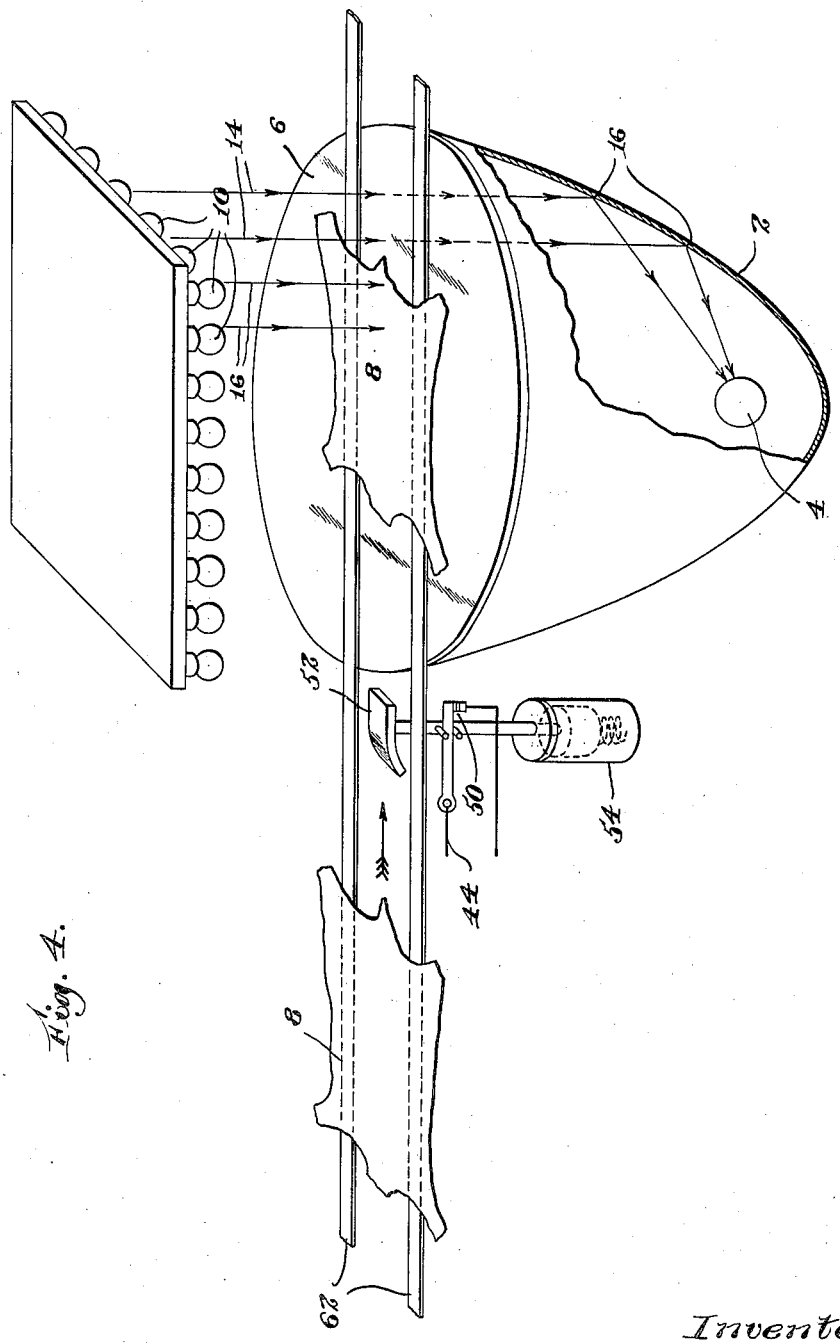

Patented Apr. 16, 1935

1,997,712

UNITED STATES PATENT OFFICE 1,997,712

APPARATUS FOR MEASURING OPTICAL DENSITIES

Paul Sherman Bauer, Cambridge, Mass., assignor to North Shore News Co., Lynn, Mass., a corporation of Massachusetts Application November 11, 1929, Serial No. 406,225

19 Claims. (Cl. 33—123)

The present invention relates to the art of measuring areas, and more particularly to the areas of hides. From a more general aspect, the invention relates to the art of measuring optical densities.

Figure 2:
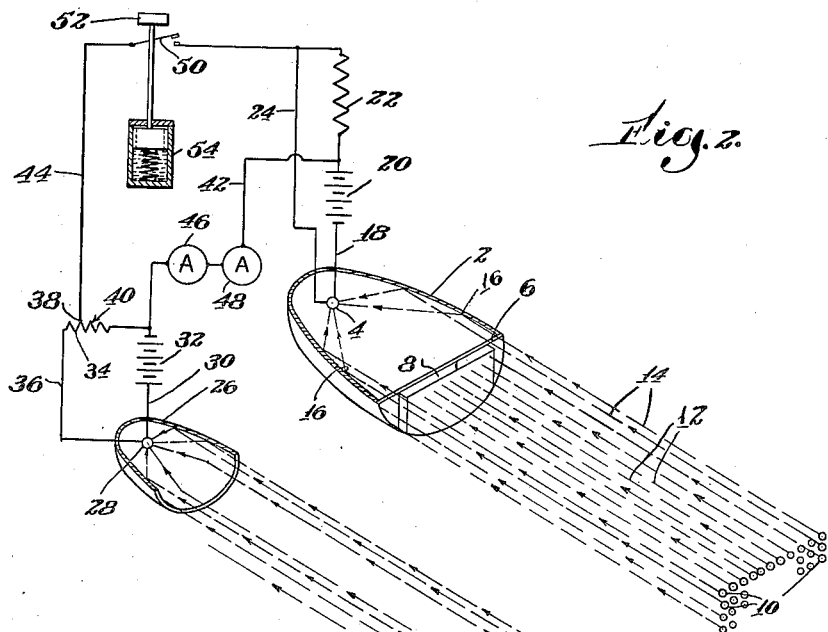
Figure 1:
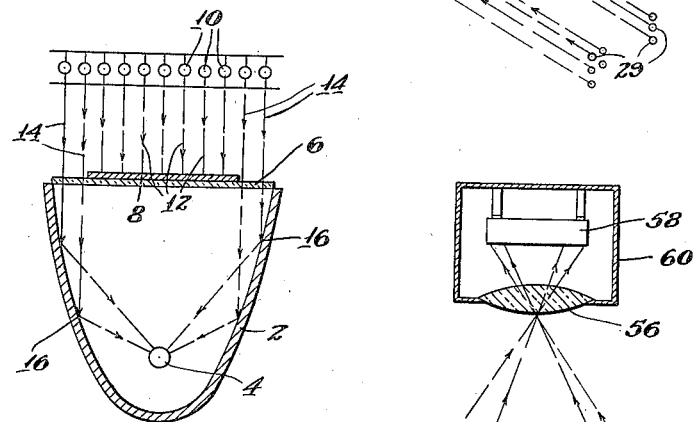
Figure 3:
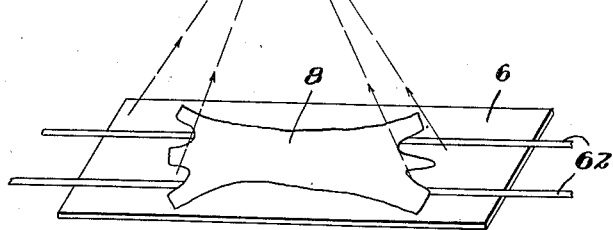

The invention will be explained in connection with the accompanying drawing, in which Fig. 1 is a diagrammatic view, in longitudinal section, illustrating the principle of operation of one embodiment of the invention; Fig. 2 is a diagram of circuits and apparatus employing the principle shown in Fig. 1, in its preferred form; and Figs. 3 and 4 are views of modifications.

A reflector 2 is shown in Figs. 1, 2 and 4 in the form of a paraboloid of revolution, with a photoelectric or light-sensitive cell 4 at the focus. The cell 4 is responsive to light impinging upon it from all directions. The paraboloid is provided with a ground-glass screen, wire-netting, or other transparent support 6 for a hide 8 or other article the area of which it is desired to measure. A bank of lamps 10 are designed and positioned so as to send substantially parallel light rays to the support 6. The rays 12 that strike the hide 8 become absorbed thereby or are reflected therefrom and play no subsequent part in the theory of the operation. The rays 14 that travel through the transparent support 6 become reflected from the inside surface of the paraboloid 2, as at 16, and, being parallel to the axis of the paraboloid, strike the light-sensitive cell 4. To facilitate the reflection of all the rays striking the inside paraboloid surface, it may be painted white. If the paraboloid is molded of plaster of paris, such white painting is rendered unnecessary.

The volume of rays striking the cell 4 is thus a measure of the difference between the area of the support 6 and the area of the hide 8. The different responses of the light-sensitive cell 4 in an electric circuit caused by the interposition of different hides 8 in the rays of light from the lamps 10 will, therefore, indicate the differences in the areas of the hides. The time intervals during which the hides are positioned on the support 6 should, of course, be equal, or otherwise related to each other in a known manner.

In order to prevent grease from the hide 8 dimming the transparency of the support 6, the apparatus shown in Figs. 1 and 4 should preferably be reversed, or inverted with the hide below the reflector 2; and in order to prevent the grease falling upon the bank of lamps 10, the reflector may be disposed not vertically above the lamps, but inclined thereto, as diagrammatically illustrated in Fig. 2. Other details, too, will be obvious to persons skilled in the art.

Further to elucidate the principle of the operation, let A represent the area of the aperture of the paraboloid, covered by the transparent support 6, and A' the area of the hide 8. Then the volume of light rays reflected upon the cell 4 from the inside surface of the paraboloid of revolution will be proportional to the difference between these two areas, or A—A'. If, then, I represents the value of the current flowing in the circuit of the cell 4 when the hide 8 is removed, and if I' represents the value of the said current after the interposition of the hide 8 into the path of the light rays, their difference, I—I', assuming a constant light intensity, will be proportional to A—A'. Or, letting $k$ represent the factor of proportionality,—a factor that is obviously a constant of the apparatus,—

$$I-I'=k(A-A')$$

This formula leads readily to a measure of the area A' of the hide 8, namely, $$A'=A-\frac{I-I'}{k}$$

The area A of the support 6 being known, the factor $k$ being determinable, and the change in current I—I' being measurable, it is easily possible to determine the area A' of the hide 8.

The arrangement diagrammatically indicated in Fig. 2 is an improved apparatus using the described principle, and so designed as automatically to measure and record the areas of successively interposed hides 8, and even to record the sum of the hide areas.

The reflector 2 is substantially the same as before described, the photo-electric cell being shown connected in an electric circuit comprising a conductor 18, a battery 20, a resistor 22 and a conductor 24. A second paraboloid reflector 26 is, however, utilized, having a light-sensitive cell 28 at its focus. The cell 28 is subjected to rays of light from an extension 29 of the bank of lamps 10. The bank of lamps 10 and its extension 29 thus constitute a common light-producing means for the cells 4 and 28. The cell 28 is connected in a circuit comprising a conductor 30, a battery 32, a resistor 34 and a conductor 36.

The voltage drop across the resistor 22, in circuit with the cell 4, will ordinarily be different from that across the resistor 34, in circuit with the cell 28. It is, however, possible to adjust a slider 38 over the resistor 34 until a portion 40 of the resistor 34 is found, the voltage drop across which equals that across the resistor 22.

A circuit may now be established including the resistor 22 and the portion 40 of the resistor 34. As illustrated, the circuit extends from one side of the resistor 22, by way of a conductor 42, to and through the portion 40 of the resistor 34, and returning to the resistor 22 through the slider 38 and by way of a conductor 44. As the voltage drops across the resistor 22 and the portion 40 of the resistor 34 are equal, no current will flow in this circuit, as may be observed by reading an ammeter 46 in the conductor 42. Indeed, a zero reading in the ammeter 46 determines the position of the slider 38 and, therefore, the length of the portion 40 of the resistor 34.

The above adjustment is assumed to have been effected under normal conditions, without any hide 8 interposed in the path of light rays from the lamps 18 and 29. The interposition of the hide 8, as diagrammatically illustrated in Fig. 2, will now cause a decrease in the volume of light rays impinging upon the cell 4 from the lamps 18, with a corresponding diminution in voltage drop across the resistor 22. This will upset the above-described conditions in the circuit 22, 42, 40, 38, 44, so that current will now flow therein.

A reading of the ammeter 46, therefore, under suitable conditions, would thus afford a measure of the area of the hide 8. Indeed, the ammeter 46 could be properly calibrated in area units so as to give the area directly. If desired, an integrating, ampere-hour meter 48 could be added to the circuit, also calibrated to read areas directly. As the time intervals during which measurements are made are equal (or otherwise related to each other), provision is thus made for directly measuring the product of the current corresponding to each hide by the time that the hide is exerting its effect upon the current.

Since the bank of lights affects both photoelectric cells 4 and 28 simultaneously, it is obvious that any variation in light intensity will affect both cells in the same proportion, thereby eliminating errors that would otherwise occur through non-constancy of the intensity of the light of the lamps. It will further be understood that this principle may be employed not only in connection with the measurement of areas, but also in any relation where measurements depend upon light intensity, as, for example, in the measurement of thicknesses or optical densities.

It has before been explained that, since the electrical response of the optical system is proportional to the area of the hide, the time intervals during which the successive hides exert their influence upon the current in the circuit of the cell 4 should preferably be equal, in order that the effect of the summation of the separate hide areas in the integrating, ampere-hour meter 48 may be accurate. The measurement during equal time intervals may be brought about in any desired way, as by closing a switch 50 in the conductor 44. The switch 50 may be closed by exerting pressure upon a thumb piece or other depressible member 52. It is only so long as the switch 50 is closed that the effect of the hide 8 can be produced upon the current measurable in the meters 46 and 48. A dash-pot 54 or any equivalent mechanism may be employed to ensure the opening of the switch 50 at the end of a predetermined time interval.

According to the modification shown in Fig. 3, the hide 8 rests, as before, upon a ground-glass or other transparent support 6. The support 6 is uniformly illuminated. In the case of ground glass, this may be effected by a source of light (not shown) from below the support.

The image of the hide 8 is projected by a reducing lens system, typified by 56, upon a photoelectric or other light-sensitive cell 58 in a lightproof chamber 60. The cell 58, of course, is disposed at the focus of the lens system 56. As the response of a photographic receiving device is proportional to the area of the object the image of which is thus received, assuming constant illumination, the projected area, even bearing the time interval in mind, is proportional to the original area. The increment in photo-electric current of the cell 58 will, therefore, be proportional to the difference in the areas between the support 6 and the hide 8, or to A—A', as before. A scheme similar to that illustrated in Fig. 2 may be employed to read the area directly.

The hides 8 may be carried into position over the support 6 in any desired manner, as by means of moving belts 62. The switch 50 may automatically be closed by the movement of each hide as illustrated in Fig. 4, and maintained closed by the dash-pot 54 for a definite time interval while the hide is at rest, during which interval the area reading is taken.

According to the present invention, therefore, the areas (or the optical densities) of the hides or other articles may be measured by a continually operating process, and the total area of all the hides measured, at any time, may be read off, at such time, upon the integrating, ampere-hour meter 48, suitably calibrated to read areas (or optical densities) directly.

Other modifications, too, will readily occur to persons skilled in the art, and all such are considered to fall within the spirit and scope of the present invention, as defined in the appended claims.

What is claimed is:

1. Area-measuring apparatus having, in combination, a source of parallel light rays, a parabolic reflector, disposed with its axis parallel to the parallel light rays, a light-sensitive element at the focus of the reflector, whereby rays of light from the source will be focused upon the element, and means for interposing an article the area of which is to be measured in the path of the said rays.

2. Area-measuring apparatus having, in combination, means for producing light, two light-sensitive elements, means for focusing the rays of light from the light-producing means upon the elements, electric means for balancing against each other the electric effects produced by the light upon the elements, and means for interposing an article the area of which is to be measured in the path of the said rays.

3. Area-measuring apparatus having, in combination, means for producing light, two light-sensitive elements, means for focusing the rays of light from the light-producing means upon the elements, means for connecting each of the elements in an electric circuit, means for balancing portions of the circuits against each other, and means for interposing an article the area of which is to be measured in the path of the said rays.

4. Apparatus of the character described having, in combination, a source of light, two light-sensitive elements, means for producing light rays and sending them over an area that is very large compared to the size of the light-sensitive elements, means for focusing the rays of light from the light-producing means upon the elements, electric means for balancing against each other the electric effects produced by the light upon the elements, and means for interposing an article that is smaller than the said area in the path of the said rays.

5. Apparatus for measuring the optical density of an article having, in combination, a source of light, two light-sensitive elements, means for producing light rays and sending them over an area that is very large compared to the size of the light-sensitive elements, means for focusing the rays of light from the light-producing means upon the elements, electric means for balancing against each other the electric effects produced by the light upon the elements, and means for interposing an article that is smaller than the said area and the optical density of which is to be measured in the path of the said rays.

6. Area-measuring apparatus having, in combination, a source of light, a light-sensitive element, a normally ineffective electric circuit the conductivity of which is varied by the light-sensitive element, means for focusing the rays of light from the source upon the element, means for interposing an article the area of which is to be measured in the path of the said rays and for thereupon rendering the electric circuit effective, and means for automatically rendering the circuit again ineffective after a predetermined time interval.

7. Apparatus of the character described having, in combination, a source of light, a light-sensitive element, means for focusing the rays of light from the source upon the element, means for interposing articles in the path of the said rays, means for measuring the effect produced by the articles upon the light-sensitive element, and means controlled by the interposition of the articles in the said path for rendering the measuring means effective during predetermined time intervals following the interposition of the articles in the said path.

8. Area-measuring apparatus having, in combination, a source of light, a light-sensitive element, means for focusing the rays of light from the source upon the element, means for interposing articles the area of which is to be measured in the path of the said rays, and means for integrating the effects produced by the articles upon the light-sensitive element during predetermined time intervals.

9. Apparatus of the character described having, in combination, a source of light, a light-sensitive element, a normally ineffective electric circuit the conductivity of which is varied by the light-sensitive element, means for focusing the rays of light from the source upon the element, means for interposing articles in the path of the said rays, and for thereupon rendering the electric circuit effective, means for automatically rendering the circuit again ineffective after predetermined time intervals, and means connected with the circuit for integrating the effects produced by the articles upon the light-sensitive element during the predetermined time intervals.

10. Apparatus of the character described having, in combination, two light-sensitive elements, means for producing light rays and sending them over an area that is very large compared to the size of the light sensitive elements, means for focusing the rays of light from the light-producing means upon the elements, means for balancing against each other the electric effects produced by the light upon the elements, means for interposing articles that are each smaller than the said area in the path of the said rays, and means for integrating the effects produced by the articles upon one of the said elements during predetermined time intervals.

11. Apparatus of the character described having, in combination, means for producing light, two light-sensitive elements, a normally open electric circuit the conductivity of which is varied by the light-sensitive elements, means for focusing the rays of light from the light-producing means upon the elements, means for balancing against each other the electric effects produced in the circuit by the light upon the elements, means for interposing articles in the path of the said rays, and means for closing the circuit for predetermined time intervals during the interposition of the articles in the said path.

12. Apparatus of the character described having, in combination, a source of parallel light traveling in an upward direction, an inverted parabolic reflector disposed with its axis parallel to the parallel light rays, a light-sensitive element at the focus of the reflector, whereby rays of light from the source will be focused upon the element, and means for interposing an article below the reflector in the path of the said rays.

13. Area-measuring apparatus having, in combination, a source of light, a light-sensitive element, means for focusing the rays of light from the source upon the element, means for successively interposing articles the area of which is to be measured in the path of the said rays, means for successively measuring the effect produced by the articles upon the light-sensitive element, and means for rendering the measuring means effective during predetermined time intervals.

14. Apparatus of the character described having, in combination, a source of light, a light-sensitive element, means for focusing the rays of light from the source upon the element, means for interposing articles in the path of the said rays during predetermined time intervals, and means for integrating the effects produced by the articles upon the light-sensitive element during the said predetermined time intervals.

15. Area-measuring apparatus having, in combination, means for producing light, two light-sensitive elements, means for focusing the rays of light from the light-producing means upon the elements, means for balancing against each other the electric effects produced by the light upon the elements, means for successively interposing articles the area of which is to be measured in the path of the said rays, and means for integrating the effects produced by the articles upon one of the said elements during predetermined time intervals.

16. Area-measuring apparatus having, in combination, means for producing light, two light-sensitive elements, means for focusing the rays of light from the light-producing means upon the elements, two impedances, means for connecting the elements each in circuit with the respective impedances, means for balancing the impedances against each other, and means for successively interposing articles the area of which is to be measured in the path of the said rays.

17. Area-measuring apparatus having, in combination, two sources of light, two light-sensitive elements, means for focusing the rays of light from the respective sources upon the elements, means whereby variations in the light intensity of the light sources affect the light-sensitive elements in the same proportion, and means for successively interposing articles the area of which is to be measured in the path of the said rays.

18. Area-measuring apparatus having, in combination, a source of light, a light-sensitive element, a normally ineffective electric circuit the conductivity of which is varied by the light-sensitive element, means for focusing the rays of light from the source upon the element, means for interposing an article the area of which is to be measured in the path of the said rays, a switch for rendering the circuit effective upon the interposition of the article in the said path, and means for rendering the switch ineffective after a predetermined time interval.

19. Area-measuring apparatus having, in combination, a source of light, a light-sensitive element, a normally ineffective electric circuit the conductivity of which is varied by the light-sensitive element, means for focusing the rays of light from the source upon the element, means for interposing an article the area of which is to be measured in the path of the said rays, a switch for rendering the circuit effective upon the interposition of the article in the said path, and means controlled by the article for rendering the switch ineffective after a predetermined time interval.

PAUL SHERMAN BAUER.